(12) United States Patent
Grosser

(10) Patent No.: US 10,839,380 B2
(45) Date of Patent: Nov. 17, 2020

(54) TRANSACTION PROCESS

(71) Applicant: GIESECKE & DEVRIENT GMBH, Munich (DE)

(72) Inventor: Caroline Grosser, Anzing (DE)

(73) Assignee: Giesecke+Devrient Mobile Security GmbH, Munich (DE)

( * ) Notice: Subject to any disclaimer, the term of this patent is extended or adjusted under 35 U.S.C. 154(b) by 626 days.

(21) Appl. No.: 15/513,781

(22) PCT Filed: Sep. 22, 2015

(86) PCT No.: PCT/EP2015/001882
§ 371 (c)(1),
(2) Date: Mar. 23, 2017

(87) PCT Pub. No.: WO2016/045788
PCT Pub. Date: Mar. 31, 2016

(65) Prior Publication Data
US 2018/0232727 A1 Aug. 16, 2018

(30) Foreign Application Priority Data
Sep. 24, 2014 (DE) .......................... 10 2014 014 109

(51) Int. Cl.
*G06Q 20/38* (2012.01)
*G06Q 20/32* (2012.01)
*G06Q 20/08* (2012.01)
*G06Q 30/06* (2012.01)

(52) U.S. Cl.
CPC ....... *G06Q 20/382* (2013.01); *G06Q 20/0855* (2013.01); *G06Q 20/322* (2013.01); *G06Q 20/385* (2013.01); *G06Q 30/06* (2013.01)

(58) Field of Classification Search
USPC .......................................................... 705/64
See application file for complete search history.

(56) References Cited

U.S. PATENT DOCUMENTS

| 8,990,888 B2 * | 3/2015 | Busser ................... G06F 21/31 380/44 |
| 9,665,868 B2 * | 5/2017 | Varadarajan .......... H04L 9/3228 |

(Continued)

FOREIGN PATENT DOCUMENTS

| DE | 19859959 A1 | 7/2000 |
| DE | 19940448 A1 | 3/2001 |

(Continued)

OTHER PUBLICATIONS

Layeghian Javen, Sameneh; Ghaemi Bafghi, Abbas; "An anonymous mobile payment protocol based on SWPP", Electronic Commerce Research, Dec. 2014, vol. 14 Issue 4, p. 635-660 (Year: 2014).*

(Continued)

*Primary Examiner* — Sarah M Monfeldt
*Assistant Examiner* — David P Sharvin
(74) *Attorney, Agent, or Firm* — Workman Nydegger

(57) ABSTRACT

A method for anonymously carrying out a transaction, wherein one-time passwords encrypted by means of a one-way function are sent by an authentication server to a service device. The non-encrypted one-time passwords are sent by the authentication server to a secure element of a mobile device. In order for a transaction to be effected, the secure element sends the one-time passwords to the service device.

20 Claims, 2 Drawing Sheets

(56) References Cited

U.S. PATENT DOCUMENTS

| | | | |
|---|---|---|---|
| 2013/0145449 A1 | 6/2013 | Busser et al. | |
| 2013/0326235 A1* | 12/2013 | Meister | H04L 9/0841 713/189 |
| 2014/0129447 A1* | 5/2014 | Ranalli | G06Q 20/383 705/44 |
| 2014/0172721 A1* | 6/2014 | Weiss | G06F 21/42 705/64 |
| 2015/0073994 A1* | 3/2015 | Nagayama | G06Q 20/204 705/64 |
| 2015/0310436 A1* | 10/2015 | Lakshmanan | G06Q 20/40 705/71 |

FOREIGN PATENT DOCUMENTS

| | | |
|---|---|---|
| DE | 10009710 A1 | 9/2001 |
| DE | 102010033232 A1 | 2/2012 |
| DE | 102011122767 A1 | 3/2013 |
| DE | 102011119103 A1 | 5/2013 |
| DE | 102012109041 A1 | 3/2014 |
| EP | 2149112 A1 | 2/2010 |
| WO | 0152127 A1 | 7/2001 |
| WO | 2011141062 A1 | 11/2011 |

OTHER PUBLICATIONS

German Search Report for corresponding German Application No. 102014014109.8, dated Nov. 6, 2014.
International Search Report for corresponding International PCT Application No. PCT/EP2015/001882, dated Nov. 26, 2015.

\* cited by examiner

TRANSACTION PROCESS

TECHNICAL FIELD

The present invention relates to a transaction method. In particular, the present invention relates to a method for anonymously carrying out a transaction.

When online transactions are carried out, users sometimes wish that their identity remains protected or hidden vis-à-vis a service provider whose service they are making use of.

A service made use of can be the purchase of a music file and/or of a text document, for example.

STATE OF THE ART

From DE 10 2011 119 103 A1 a method is known for authenticating a person vis-à-vis a server instance, wherein the person employs a data carrier as authentication means.

Further, in the state of the art so-called authentication service providers are known who, as a provision of services, effect the authentication of a person for a service, for example for a cloud service. Such authentication service providers are also known as "authentication-as-a-service service providers" (aaas). An advantage for a cloud service that makes use of an authentication service provider is that it no longer needs to take care of security requirements necessary with respect to authentication. This is done for him by the authentication service provider.

Further, in the state of the art fee-based services are known, where invoicing takes place on the basis of the number of accesses or the duration of access. Such services require that it is necessary for users to charge a credit account with the service. The credit account is necessary since the invoicing of very small amounts is generally unattractive due to the high transaction fees incurred. Upon opening a credit account with the service, it is necessary that the user reveals his identity. This is the only way in which a secure allocation is possible between the credit account and the user. However, for users of such a fee-based service it is inconvenient to always deposit a credit amount with the service, in order to then gradually make use of said credit amount.

Further, from the state of the art an anonymous payment method is known in which the user buys a credit card with a PIN using cash, wherein a corresponding amount of money is allocated to said PIN. With this credit card (for example a PaysafeCard) it is possible to anonymously pay an amount of money by entering the PIN of the credit card for payment.

In summary, the cited prior art has the disadvantage that there is no payment method by which it is possible anonymously to pay small amounts. For even the anonymous payment method with the credit card requires that a certain minimum amount is always paid. In addition, the user is usually not prepared to always enter his PIN for paying very small amounts.

STATEMENT OF THE INVENTION

It is the object of the invention to make available a method for anonymously carrying out a transaction which solves the known problems of the state of the art and is further suitable to make possible a secure and anonymous payment of both large and small amounts.

The object is achieved by a method according to the subject matter of claim 1. Preferred embodiments of the method according to the invention result from the dependent claims.

The invention is based on the idea of providing an authentication server as a link between a secure element, a payment device and a service device in such a fashion that it is possible with the secure element to effect a payment to the service device anonymously.

Accordingly, the method for anonymously carrying out a transaction includes establishing a first connection between a secure element and an authentication server, establishing a second connection between the authentication server and a payment device, transferring an amount of money from the secure element to the payment device via the authentication server, producing at least one one-time password OTP, wherein the number of one-time passwords corresponds to the transferred amount of money, and sending the at least one one-time password to (at least) one service device via a third connection, wherein the one-time password is sent only after its encryption with a one-way function.

A "secure element" is a unit in a mobile device, in which data can be stored particularly securely. The secure element can have different form factors. For example, the secure element can be a chip firmly incorporated in the mobile device, a SIM card and/or a (micro-) SD card.

According to the invention, the "mobile device" is for example a mobile phone, a tablet PC or the like. The mobile device is equipped with an interface, in particular with a contactless interface, for example via GSM and/or WLAN, and/or a contact-type interface.

An "authentication server" within the meaning of the invention is employed to authenticate a user vis-à-vis a further service, such as the payment device and/or the service device. Further tasks of the authentication server can be: Management of a plurality of different service devices, decryption of the received data, redeeming one-time passwords at the payment device, verification of the payment (successful redemption), generating one-time passwords (OTPs), treating the one-time passwords with the one-way function (e.g. hash), intermediately storing one-time passwords lists (OTP|Hash (OTP)), allocation of the one-time passwords to the correspondingly desired service device, transmission of one-time passwords treated with the one-way function (hashed OTPs) to the correspondingly desired service device, encryption of the one-time passwords (e.g. with a public key of the secure element), transmission of the encrypted original one-time password list to the secure element.

At a "payment device", a user can effect a payment preferably anonymously. For this purpose, the user can transfer money to the payment device, for example by means of a PaysafeCard. Alternative payment methods, such as by means of a prepaid credit card or the like, are also possible.

A "service device" within the meaning of the invention is understood as a device intended for anonymous payment. In return, the service device will make available a service after receipt of the payment. Of course it is possible that an amount once paid to the payment device is employed for use in a multiplicity of service devices. It is also possible that the amount can be employed in a single service device to pay for a multiplicity of different services/goods.

With the method according to the invention, it is possible particularly advantageously to make available an anonymous payment method, since the service device and the payment device are independent of each other. Further, it is not necessary for the authentication server to permanently store the one-time passwords and/or one-way passwords encrypted with the one-way function. For the one-time passwords can be stored in the secure element and the one-time passwords encrypted with the one-way function can be stored at the service device. Further, the security requirements for the service device are not particularly high, since it is only necessary here to store the passwords encrypted by means of the one-way function. When someone wishes to use the service device, however, it is necessary to transfer to the service device the original one-time password, i.e. without it being encrypted with the one-way function.

According to one embodiment, the one-way function is a hash function. Such hash functions are known in cryptology and are distinguished among other things by the circumstance that it is practically impossible to find an input value for a given output value. In other words, it is relatively easy to compute an output value from a known input value. The converse case, that is the computation of an input value from an output value, is practically impossible. Thus it can be ensured that only that person can redeem the amount of money in the service device who knows the at least one initial one-time password. It is not sufficient to transmit the one-time password hashed with the hash function to the service device.

To further enhance security, the one-time password can be supplied with a randomly chosen character sequence prior to encryption. This method is known in cryptology as "salting" and describes a procedure in which the randomly chosen character sequence is attached to the one-time password before applying the hash function. By employing the randomly chosen character sequence in connection with the hash function the security of the procedure is increased additionally. Further, the one-time passwords produced can be supplied with an expiration date in order to limit access to the service of the service device in time.

According to a further particularly preferred embodiment, after the receipt of the amount of money from the secure element (via the authentication server), the payment device confirms receipt of the amount of money to the authentication server. In this fashion, the authentication server is notified that the payment device has received the amount of money and thus said amount is at the disposal of the authentication server. Further, the service device is informed by the authentication server about the received payment, since the authentication server knows that payment has been effected. The actual transfer of the money to the service device can be effected by methods known in the state of the art.

According to a further embodiment, the authentication server sends the at least one one-time password to the secure element, wherein the sending of the one-time password to the secure element can be effected preferably in encrypted fashion. The at least one one-time password is sent to the secure element without it having been encrypted with the one-way function. In this fashion, the secure element knows the "original" one-time password and can employ it to make use of a service of the service device. In this fashion, a particularly secure and simple authorization of a transaction is made possible.

Further, according to a further particularly preferred embodiment, the at least one one-time password is produced by the authentication server. In this fashion, the authentication server can start generating the one-time passwords after it has been notified that the payment device has received the amount of money. This increases the security of the transaction method, since the payment device does not know the one-time passwords.

Further, the authentication server can have a list of the one-time passwords and of the passwords encrypted with the one-way function. The provision of such a list can advantageously serve to ensure an allocation between the passwords and the passwords encrypted with the one-way function.

According to a further particularly preferred embodiment, the authentication server sends the at least one one-time password encrypted with the one-way function to the service device via the third connection. In this fashion, it is ensured that the service device receives the one-time passwords encrypted with the one-way function directly from the authentication server.

According to a further embodiment, the number of passwords can correspond to the sum of the amount of money. In this fashion, it is possible to divide an amount of money once paid to the payment device into any desired number of individual amounts and to allocate a one-time password to each individual amount. It is possible that a one-time password always corresponds to the same amount of money, for example two cents. Alternatively, it is possible that every one-time password corresponds to a different amount of money. In this fashion, different denominations can be realized more easily.

According to one embodiment, the service device has a list of the one-time passwords encrypted with the one-way function which have not yet been employed. These not yet employed one-time passwords are employed to pay an amount of money to the service device. For this purpose—according to a further embodiment—, the secure element sends a one-time password not encrypted with the one-time function (from the list of not yet employed one-time passwords) to the service device. In this fashion, a particularly simple and reliable payment method is realized, since for the payment of an amount it is merely necessary to send a one-time password not yet encrypted with the one-time function to the service device. To check whether the one-time password is a valid one-time password which has not yet been used up, the service device applies the one-way function to the password. In the event that the two passwords match, to which the one-way function has been applied in each case, the service device recognizes that there is a valid payment intent and permits the use of the desired one of its services.

In order to pay a higher amount to the service device, it can be necessary in accordance with one embodiment that several one-time passwords (to which the one-way function was not applied) are transmitted to the service device. The number of transmitted one-time passwords then corresponds to the payable amount.

DETAILED DESCRIPTION OF PREFERRED EMBODIMENTS OF THE INVENTION

Figure 1:
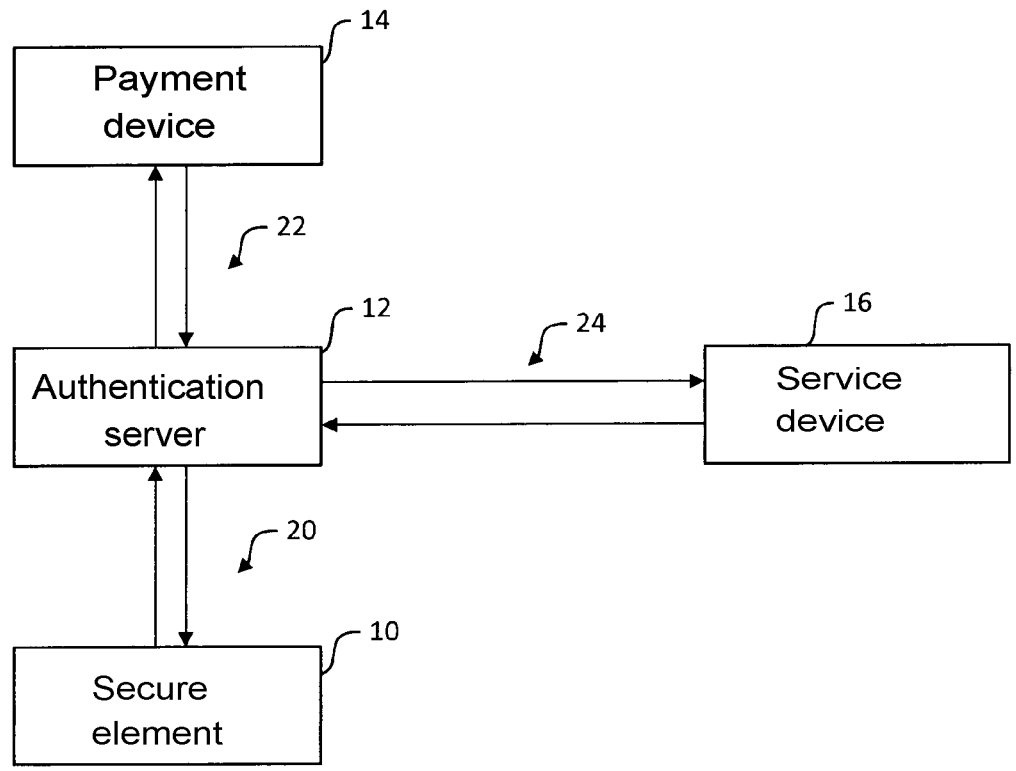
FIG. 1 shows a schematic sequence of a money-charging method according to the invention.
Figure 2:
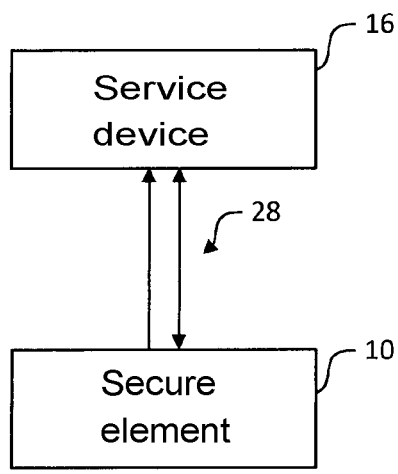
FIG. 2 shows a schematic sequence of a payment method according to the invention.
Figure 3:
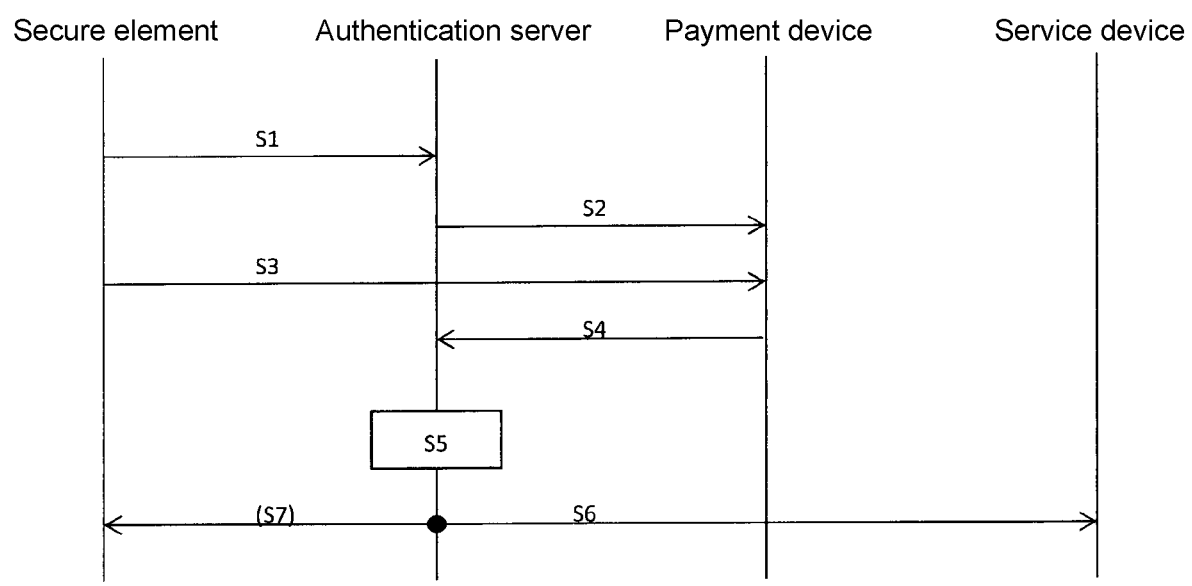
FIG. 3 shows a sequence of a method according to the invention.

The following is a description of the method according to the invention by means of purely exemplary embodiments with reference to the attached FIGS. 1 to 3.

In this connection, FIG. 1 schematically shows a sequence upon transferring an amount of money from a secure element 10 to a payment device. For this purpose, initially a first connection 20 is established between the secure element 10 and an authentication server 12 over an air interface (GSM/WLAN). The secure element 10 informs the authentication server 12 of its intention to pay an amount of money to a payment device 14. In response, the authentication server 12, to which the secure element 10 has authenticated itself, establishes a second connection 22 to the payment device 14. The second connection 22 can be set up by means of known methods.

Subsequently, the amount of money is transferred from the secure element 10 to the payment device 14 via the authentication server 12. To ensure anonymity upon paying the amount of money, for example a prepaid credit card or other anonymous payment method, such as a PaysafeCard, can be employed for payment. As soon as the amount has been paid to the payment device 14, the payment device confirms receipt of the amount of money to the authentication server 12.

As soon as the authentication server 12 has been informed about the payment receipt at the payment device 14 by means of the second connection 22, the authentication server 12 generates one-time passwords in accordance with the sum of the paid amount. When, for example, EUR 10 have been transferred to the payment device, the authentication server will produce a total of 500 one-time passwords of a denomination of EUR 0.02. The person knowing these one-time passwords can use them for paying to admitted service facilities 16 and/or making use of a service.

The one-time passwords are subsequently encrypted by the authentication server 12 with a one-way function, such as a hash function. To further enhance security, the one-time passwords can be supplemented with a randomly chosen character sequence before encryption. This procedure is referred to in cryptology as "salting". Alternatively, the one-time passwords can have a limited validity period.

In dependence on the request of the user of the secure element 10 all one-time passwords encrypted with the one-way function are transferred to one service device 16 or to a multiplicity of different service devices 16. Thereupon, the service device 16 knows the one-time passwords encrypted with the one-way function, and the authentication server knows both the "original" one-time passwords and the one-time passwords encrypted with the one-way function.

Via the first connection 20, the "original" one-time passwords are subsequently transferred to the secure element 10. For the transfer of the passwords from the authentication server 12 to the secure element 10 via the first connection 20 to be effected securely, the first connection 20 can be a secure connection.

After the transfer of the one-time passwords, the secure element 10 is in possession of the one-time passwords. In order to use a fee-based service of the service device 16, it is necessary that "original" one-time passwords in accordance with the sum of the fee for use are transferred from the secure element 10 to the service device 16. FIG. 2 illustrates this sequence.

First, a fourth connection 28 is set up between the secure element 10 and the service device 16. The secure element 10 sends a one-time password to the service device 16. The service device 16 applies the one-way function to the one-time password sent by the secure element 10. Subsequently, the service device 16 checks whether a one-time password encrypted with the one-way function has been deposited with it which matches the password just encrypted with the one-way function. When a match of the passwords is detected, this means, conversely, that the one-time password has not yet been employed, and that said password can consequently be made use of for using the service of the service device 16. In dependence on the sum of the amount of money required for using the service device 16, a plurality of "original" one-time passwords can be sent to the service device 16 by the secure element 10. The number of one-time passwords corresponds to the sum of the payable amount of money.

FIG. 3 shows a flowchart representing the sequence of the method according to the invention. In this method, in a first step S1, as already stated above, a first connection 20 is established between a secure element 10 and an authentication server 12. Subsequently, in a second step S2, a second connection 22 is established between the authentication server 12 and a payment device 14. As soon as these two connections 10, 12 have been established, an amount of money is transferred from the secure element 10 to the payment device 14 via the authentication server 12.

The payment device 14 confirms the receipt of the amount of money to the authentication server 12 in a subsequent step S4.

The authentication server 12 produces at least one one-time password in a next step S5, wherein the number of one-time passwords corresponds to the amount of money transferred to the payment device 14.

In a next step S6 the authentication server 12 sends the at least one one-time password to a service device 16 via a third connection 24, wherein the one-time password is sent only after its encryption with a one-way function (hash function). Parallel thereto or subsequently, the "original" one-time passwords can be sent to the secure element 10 in an optional step S7.

The transaction is concluded, as shown in FIG. 2, by the secure element 10 transferring one of the passwords transferred in step S7 to the service device 16 via a fourth connection 28 that can be set up analogously to the first connection 20. The passwords can be stored in the secure element. This makes it difficult for third persons to access the passwords in the secure element 10 without due authorization. By the service device 16 applying the one-way function to the one-time password sent by the secure element 10 to the service device 16, the service device 16 can check whether the one-time password has already been employed and/or whether the one-time password is valid. When the password is valid, applying the one-time function to the one-time password will result in a match with a password deposited with the service device 16. In case of a match the service of the service of the service device 16 can be used by the secure element 10.

When the one-way function is applied before sending the one-time passwords to the service device 16 via the third connection 24, the authentication server 12 can check whether there results a duplication of passwords after applying the one-way function. In case a duplication of passwords results, the authentication server 12 generates a further one-time password and the one-way function is applied to this new one-way password.

The invention claimed is:

1. A method for anonymously carrying out a transaction, the method comprising:
   establishing a first connection between a secure element and an authentication server,
   establishing a second connection between the authentication server and a payment device,
   transferring an amount of money from the secure element to the payment device via the authentication server, producing at least one one-time password, wherein the number of one-time passwords corresponds to the transferred amount of money, and sending the produced one-time passwords to a service device via a third connection, wherein the at least one one-time password is sent only after its encryption with a one-way function.

2. The method according to claim 1, wherein the one-way function is a hash function.

3. The method according to claim 2, wherein the one-time password is supplied with a randomly chosen character sequence prior to encryption.

4. The method according to claim 1, wherein the payment device confirms receipt of the amount of money to the authentication server.

5. The method according to claim 1, wherein the authentication server sends the at least one one-time password to the secure element, wherein the sending is effected preferably in encrypted fashion.

6. The method according to claim 1, wherein the authentication server produces the at least one one-time password.

7. The method according to claim 1, wherein the authentication server has a list of the one-time passwords and of the one-time passwords encrypted with the one-way function.

8. The method according to claim 1, wherein the authentication server sends the at least one one-time password to the service device via the third connection.

9. The method according to claim 1, wherein the number of the one-time passwords corresponds to the sum of the amount of money.

10. The method according to claim 1, wherein the service device has a list of the one-time passwords that have been encrypted with the one-way function and have not yet been employed.

11. The method according to claim 1, wherein for concluding a transaction the secure element of a mobile device sends at least one one-time password not encrypted with the one-time function to the service device.

12. The method according to claim 11, wherein the service device applies the one-way function to the sent one-time passwords.

13. The method according to claim 11, wherein the number of sent one-time passwords corresponds to an amount of money payable to the service device.

14. The method according to claim 1, wherein the secure element is storage unit in a mobile device in which data can be stored securely.

15. The method according to claim 14, wherein the mobile device is a mobile phone or a tablet PC that is equipped with a contactless interface.

16. The method according to claim 1, wherein the secure element is a chip firmly incorporated in a mobile device, is a SIM card, or is a micro SD card.

17. The method according to claim 1, wherein the service device and the payment device are independent of each other.

18. The method according to claim 1, wherein the number of sent one-time passwords corresponds to an amount of money payable to the service device, and money is subsequently transferred to the service device.

19. The method according to claim 1, further comprising
establishing a fourth connection between the secure element and the service device,
the secure element transferring one of the passwords previously transferred to the service device via the fourth connection.

20. The method according to claim 1, further comprising
establishing a fourth connection between the secure element and the service device,
the secure element sending a one-time password to the service device,
the service device applying the one-way function to the one-time password sent by the secure element, and
the service device checking whether a one-time password encrypted with the one-way function has been deposited with it matches the password encrypted with the one-way function.

* * * * *